(12) United States Patent
Junkins

(10) Patent No.: US 6,674,433 B1
(45) Date of Patent: Jan. 6, 2004

(54) ADAPTIVELY SUBDIVIDING A SUBDIVISION SURFACE

(75) Inventor: Stephen Junkins, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/523,126

(22) Filed: Mar. 10, 2000

(51) Int. Cl.[7] .............................................. G06T 17/00
(52) U.S. Cl. ...................................................... 345/423
(58) Field of Search .................................. 345/419, 423, 345/441–442, 420, 421, 428, 427, 426, 424, 582, 581, 589

(56) References Cited

PUBLICATIONS

Duchaineau et al ("ROAMing Terrain: Real–time Adapting Meshes": 1997 IEEE—0–8186–8262–0/97).*
Schmitt et al ("An Adaptive Subdivision Method for Surface–Fitting from Sample data": ACM–0–89791–196–2/86/008/0179: 1986.*
Dyn et al., "A Butterfly Subdivision Scheme for Surface Interpolation with Tension Control," ACM Transactions on Graphics, vol. 9, No. 2, Apr. 1990, pp 160–169.

Zorin et al., "Interpolating Subdivision for Meshes of Arbitrary Topology," Tech. Rep. CS–TR–96–06, Caltech, Dept. of Computer Science. Caltech, 1996.

* cited by examiner

*Primary Examiner*—Almis R. Jankus
(74) *Attorney, Agent, or Firm*—Fish & Richardson P.C.

(57) ABSTRACT

Subdividing a subdivision surface includes traversing the subdivision surface to locate a target polygon on the subdivision surface, partially subdividing the target polygon, re-traversing the subdivision surface to locate the target polygon on the subdivision surface, and additionally subdividing the target polygon. Data is stored indicating a point in a subdividing process where the partially subdividing left off and the additionally subdividing includes subdividing the target polygon beginning at the point in the subdividing process where the partially subdividing left off.

39 Claims, 5 Drawing Sheets

ADAPTIVELY SUBDIVIDING A SUBDIVISION SURFACE

TECHNICAL FIELD

This invention relates to subdividing a subdivision surface of a three-dimensional (3D) model.

BACKGROUND

A 3D model is made up of one or more polygons which define a subdivision surface. Subdividing the polygons increases the number of polygons in the 3D model and, thus, the granularity and the quality of the approximation of the surface represented by the 3D model. However, increasing surface granularity decreases rendering performance.

Uniform subdivision techniques subdivide each polygon in the 3D model the same number of times. By contrast, adaptive subdivision techniques subdivide polygons in the 3D model different numbers of times.

DETAILED DESCRIPTION

A 3D model 10 (FIG. 1) is comprised of interconnecting polygons 11. Polygons 11 are triangles in this embodiment; however, other types of polygons may be used. Groups of polygons are organized into meshes. Polygons which have not been subdivided make up a "base mesh".

One or more base meshes defines an initial subdivision surface for 3D model 10. Each polygon in the initial subdivision surface can be subdivided one or more times. By increasing the number of polygons that make up 3D model 10, the granularity (or resolution) of 3D model 10 increases.

Figure 2:
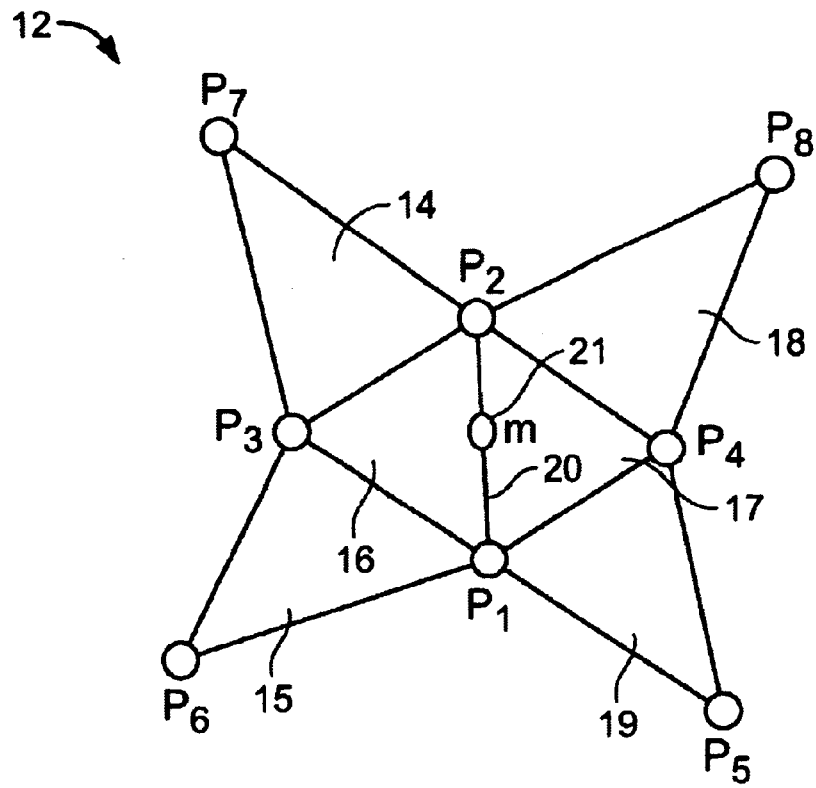
FIG. 2 is a view of a butterfly mask used in a butterfly subdivision process.

Any type of subdivision processing may be used to subdivide the polygons. One such subdivision process is called the "butterfly subdivision" process. The butterfly subdivision process uses a butterfly-shaped mask 12 to define a local "neighborhood" of polygons 14 to 19 around an edge 20 to be subdivided (see FIG. 2). A midpoint (m) 21 of edge 20 is determined based on the locations of vertices p, to $P_8$ of polygons 14 to 19 and a weighting factor (w), as follows:

$$m = \tfrac{1}{2}(P_1 + P_2) + 2w\,(p_3 + P_4) - w(p_5 + P_6 + P_7 + P_8).$$

Weighting factor "w" (also called the "global tension parameter") controls the amount of smoothing to be applied to a subdivision surface. It is chosen to emphasize the vertex connectivity that most influences local smoothness of the subdivision surface at midpoint m.

To perform the butterfly subdivision process on a whole subdivision surface, a midpoint "m" is determined for every edge on the subdivision surface and the resulting midpoints are connected to form new, smaller polygons (in this case, triangles). By virtue of this process, every original polygon in the subdivision surface is replaced by four smaller polygons, resulting in a subdivision surface having greater granularity/resolution. The butterfly subdivision process may be repeated for the smaller polygons until the desired level of subdivsions is achieved.

Figure 3:
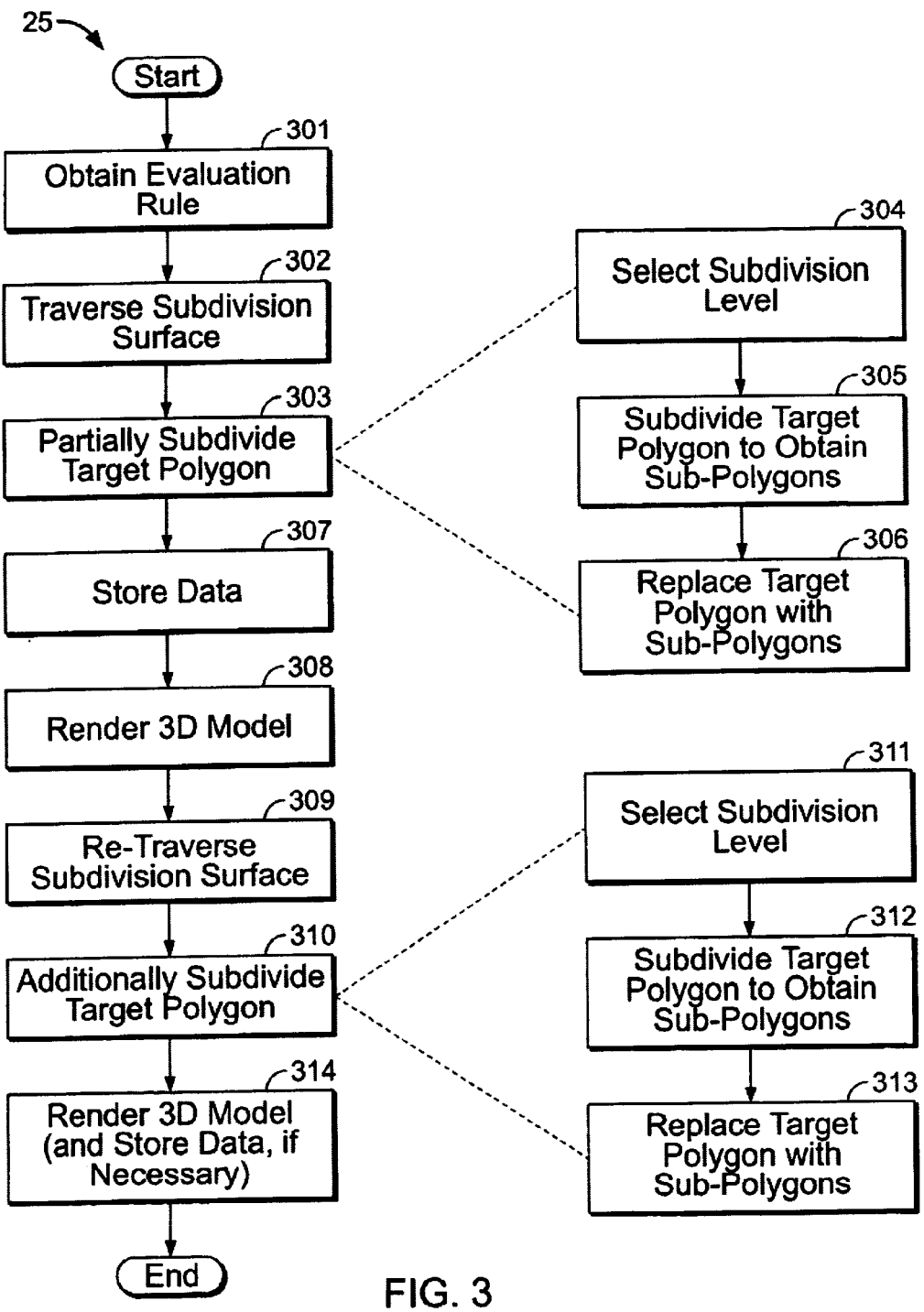
FIG. 3 is a flowchart of a process for subdividing polygons in the 3D model according to one embodiment of the invention.

Referring to FIG. 3, a process 25 is shown which makes use of the butterfly subdivision process to subdivide a subdivision surface. Process 25 is performed on frames of 3D geometry, such as video imagery for video games, to increase the resolution of the 3D geometry without substantially increasing the amount of processing required to render the 3D geometry.

Figure 1:
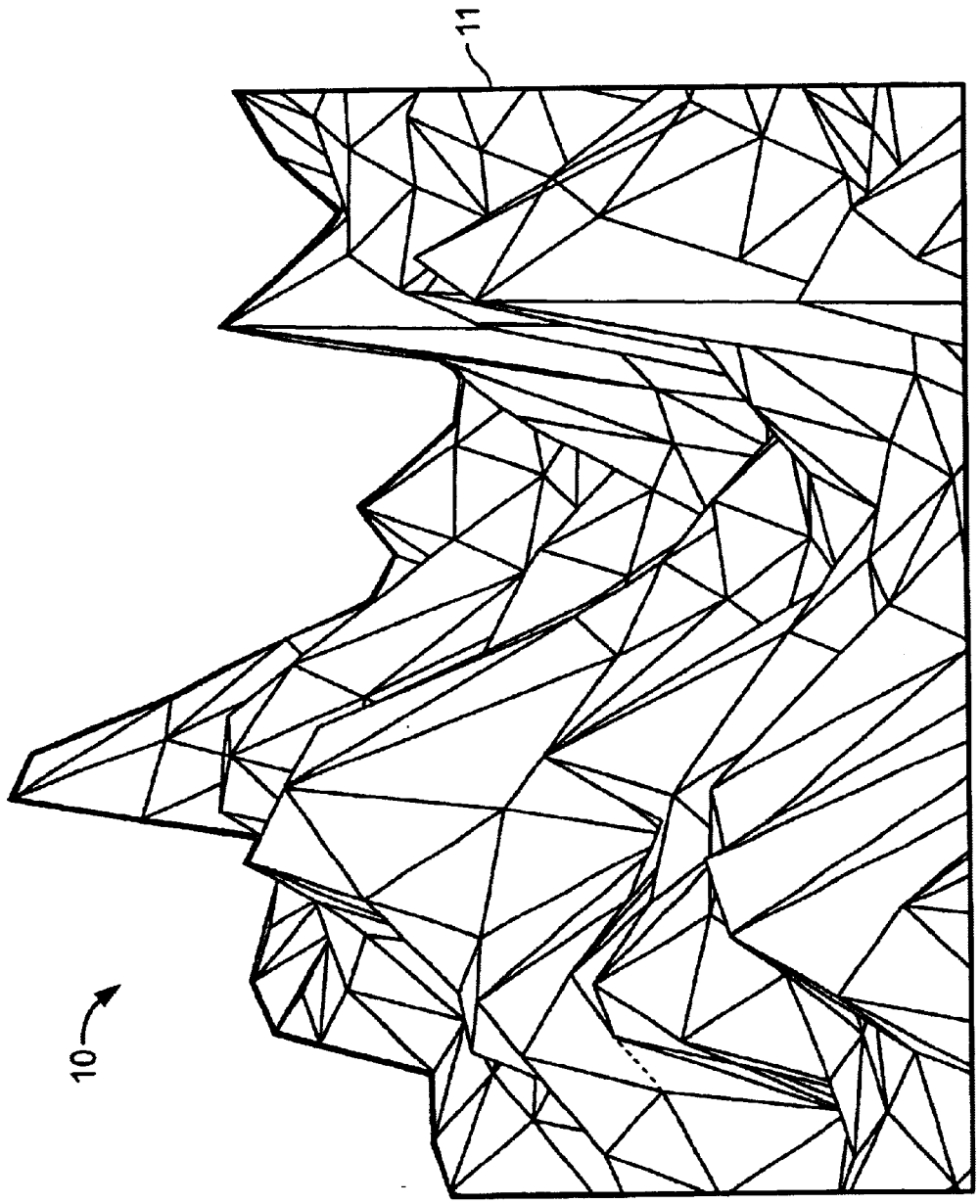
FIG. 1 is a perspective view of a 3D model.

3D geometry is often viewed from the perspective of a virtual camera that moves through a 3D space occupied by a 3D landscape model, such as 3D model 10 (FIG. 1). Process 25 is performed to reduce the number of subdivisions performed on polygons in 3D model 10 as those polygons are viewed by the virtual camera. As a result, the granularity of 3D model 10 is not substantially increased while the virtual camera is in motion, which enables faster and more efficient 3D rendering. When the virtual camera stops, slows down, revisits and/or focuses in on an object in 3D model 10, process 25 increases the number of subdivisions on the appropriate objects in 3D model 10, thus increasing their granularity.

Adaptive subdivision techniques are utilized in process 25 to provide more details for specific areas of a subdivision surface than for other areas of the subdivision surface. For example, portions of 3D model 10 for which greater detail is desired, such as peaks of a mountain, may be subdivided more than other portions of 3D model 10. The portions of 3D model 10 that are subdivided is determined by adaptive subdivision parameter(s) for 3D model 10. These parameters may be stored in association with polygons for 3D model 10.

Process 25 is performed on frames of 3D geometry. For example, blocks 301 to 308 of process 25 may be performed on a first frame of video, then blocks 309 to 314 may be performed on a second frame of video that has features in common with the first frame. Frames with features in common are said to have "spatial coherence". Sequential frames of video typically have high degrees of spatial coherence. Thus, the first and second frames above may be sequential frames; however, non-sequential frames may also be used in process 25.

For illustration's sake, process 25 will be described with reference to the subdivision surface defined by 3D model 10 (FIG. 1). To begin, process 25 obtains (301) an evaluation rule that has been designated, e.g., by a user or by another computer program. The evaluation rule may be obtained from a memory based on information input by a user. The evaluation rule defines the level of subdivisions to be performed on an area of a subdivision surface. What is meant by "level of subdivisions" here is the number subdivision operations performed relative to an original polygon.

Figure 4:
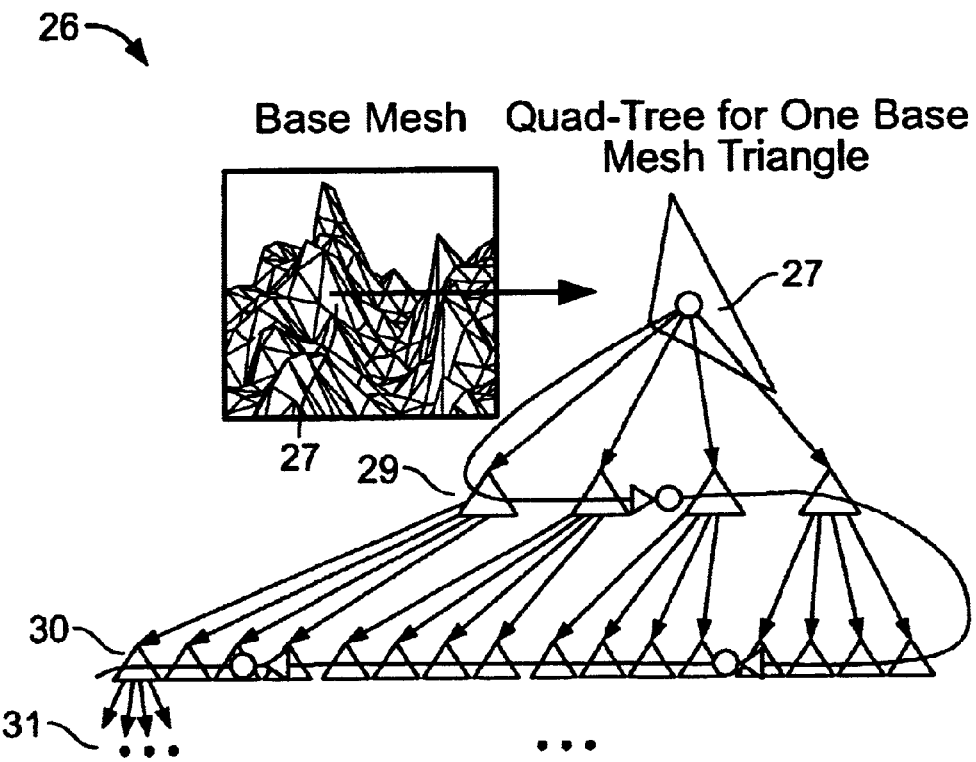
FIG. 4 is a view of a quad tree for one of the polygons.

In this regard, a triangular polygon in a subdivision surface is associated with a quad tree. The quad tree may be stored beforehand for each polygon or it may be computed during run-time "on-the-fly" using the butterfly subdivision process described above. A quad tree 26 of polygon 27 is shown in FIG. 4. As shown, polygon 27 is subdivided at a first subdivision level 29 into four smaller "sub" polygons. At a second subdivision level 30, each of these four smaller sub-polygons is subdivided into four still smaller sub-polygons. At a third subdivision level 31, each of the sub-polygons at the second subdivision level 30 is subdivided into four still smaller sub-polygons, and so on. The polygons at any subdivision level can be substituted for the original polygon 27 in order to increase the granularity of the portion of a 3D model represented by polygon 27.

The evaluation rule obtained in 301 defines how many subdivisions to perform on a target polygon in the subdivision surface of 3D model 10. An example of an evaluation rule includes determining a distance between a virtual camera (not shown) and a 3D object in 3D model 10 and performing subdivisions on only 3D objects within a predetermined distance of the virtual camera. This evaluation rule ensures that "near" objects, relative to the virtual camera are displayed with fine granularity (high resolution) and that rendering bandwidth is not wasted on increasing the granularity of "far" objects. As a result, a relatively high-quality 3D model can be produced in a relatively short time.

In FIG. 3, process 25 traverses ( 302) the subdivision surface in a "breadth-first" manner, meaning that the virtual camera pans across the subdivision surface of a first frame of 3D video containing 3D model 10. As the virtual camera pans across the subdivision surface, process 25 selects "target" polygons, in turn, on that subdivision surface.

Process 25 partially subdivides ( 303) a target polygon according to the evaluation rule obtained in 301. The target polygon is partially subdivided in the sense that all subdivisions specified for that polygon (e.g., by its adaptive subdivision parameter) are not necessarily performed on the pass through 3D model 10 in the first frame. For example, if a particular polygon is supposed to be subdivided to four levels and the evaluation rule specifies that only two levels of subdivision are to be performed on the object, then only the two levels of subdivision specified by the evaluation rule are performed. Hence, the target polygon is only partially subdivided. Partial subdividing in 303 may be performed in accordance with a time-out (traversal) rule. According to this rule, subdivision processing is performed on a target polygon for a pre-specified time slice. Once that time slice is over, subdivision processing ceases for that particular target polygon and process 25 moves on to a next target polygon in the subdivision surface.

In 303, subdivision processing is performed by selecting (304) a level of subdivision based on the evaluation rule obtained in 301 and an adaptive subdivision parameter for the target polygon, performing subdivision processing (305) on the target polygon if necessary (for example, if a quad tree for the polygon is not already stored), and replacing (306) the target polygon with selected sub-polygons from the quad tree.

Process 25 stores (307) data indicating a point in the subdivision process where the "partially subdividing" ended and the corresponding subdivision quad tree data for the target polygon at that point. For example, if a target polygon is designated to be subdivided four times, and "partially subdividing" only results in two subdivisions for that polygon, process 25 stores data indicating, e.g., that two more levels of subdivision need to be performed on the target polygon. Additional levels of subdivision are performed in one or more subsequent frames of the 3D video.

Process 25 renders (308) the current frame of video, including 3D model 10. As a next frame of video is received that contains 3D model 10 or a portion thereof, process 25 re-traverses (309) 3D model 10. Process 25 re-traverses the subdivision surface in a "breadth-first" manner, as above. As the virtual camera pans across the subdivision surface, process 25 selects target polygons, in turn, on that subdivision surface.

Process 25 additionally subdivides (310) the target polygon that was partially subdivided in 303 above. The additional subdividing is performed according to the evaluation rule obtained in 301. The target polygon is additionally subdivided beginning at a point in the subdividing process where the partially subdividing left off using the quad tree data stored for that point in 307. For example, if a particular polygon is supposed to be subdivided to four levels and only two levels of subdivisions were previously performed, then additional subdivisions are performed in 310. The subdivision process may be completed in 310 or, alternatively, the subdividing process may be continued in subsequent frames. Subdividing is performed in 310 (blocks 311 to 313) in substantially the same manner as it was performed in the first video frame in block 303 (blocks 304 to 306) above.

Figure 5:
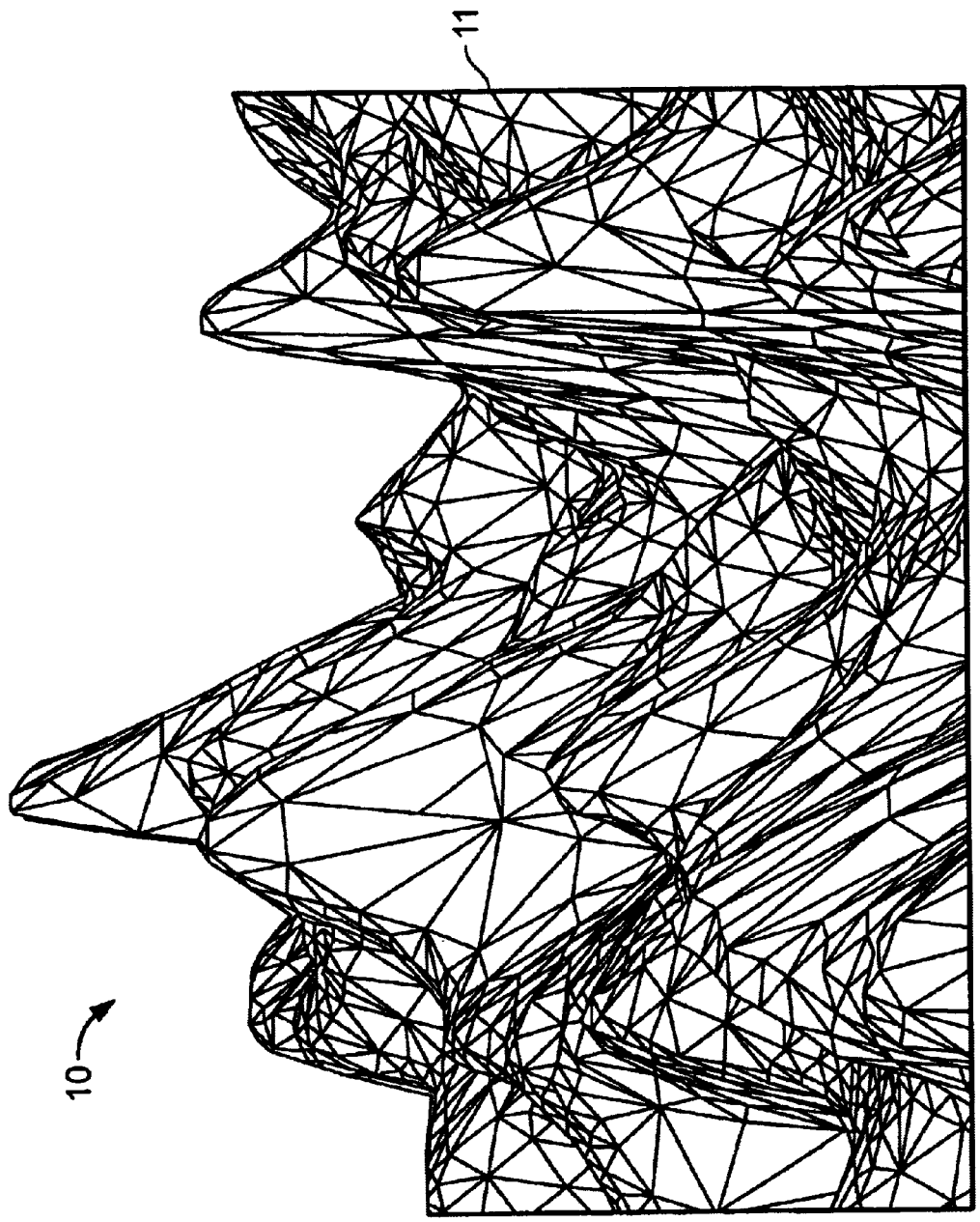
FIG. 5 is a perspective view of the 3D model of FIG. 1 after polygons in the 3D model have been subdivided according to the process of FIG. 3.

Process 25 renders ( 314) the second frame of video, including 3D model 10 based on the subdivisions performed in 310. Blocks 309 to 314 of process 25 may be repeated for subsequent (third, fourth, etc.) frames of video until target polygons have been completely subdivided or until those polygons are no longer in the video frame. FIG. 5 shows 3D model 10 subdivided according to process 25. Pseudocode for implementing process 25 is shown in the attached Appendix.

Process 25 is performed in 3D space, meaning that it is performed using 3D data. By processing data in 3D space, as opposed to 2D space, process 25 can be performed using a graphics accelerator card(s) of a personal computer.

Figure 6:
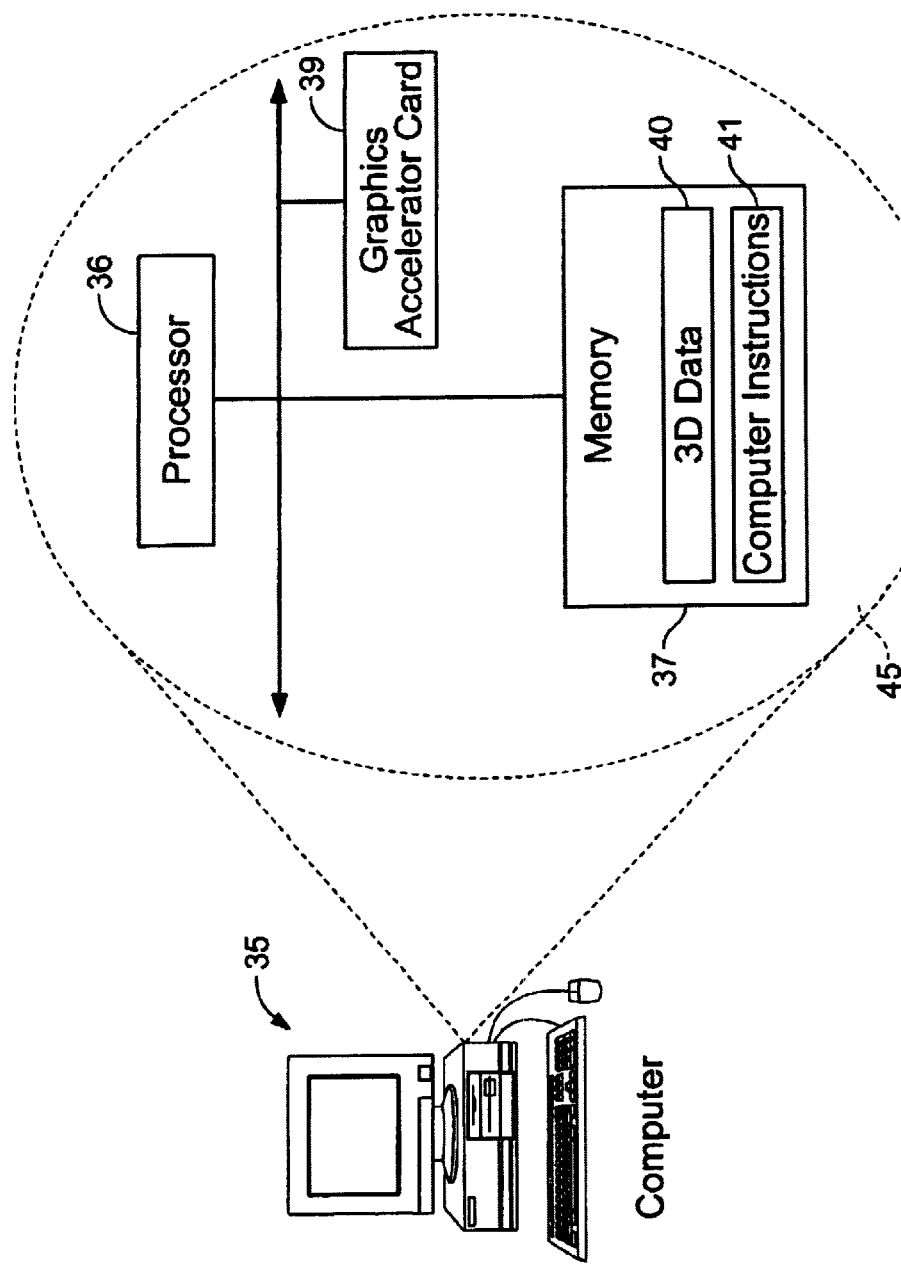
FIG. 6 is a perspective view of computer hardware that can be used to implement the process of FIG. 3.

In this regard, FIG. 6 shows a computer 35 for rendering 3D objects using process 25. Computer 35 includes a processor 36, a memory 37 (e.g., a hard disk), and a 3D graphics accelerator card 39 for processing 3D data (see view 45). Memory 37 stores 3D data 40 for 3D model 10, and computer-executable instructions 41 for performing 3D subdividing and rendering according to process 25.

Process 25, however, is not limited to use with any particular hardware or software configuration; it may find applicability in any computing or processing environment. Process 25 may be implemented in hardware, software, or a combination of the two. Process 25 may be implemented in one or more computer programs executing on programmable computers that each include a processor, a storage medium readable by the processor (including volatile and non-volatile memory and/or storage elements), at least one input device, and one or more output devices. Program code may be applied to data entered using an input device to perform process 25 and to generate output information. The output information may be applied to one or more output devices.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 25. Process 25 may also be implemented as a computer-readable storage medium, configured with a computer program, where, upon execution, instructions in the computer program cause the computer to operate in accordance with process 25.

Other embodiments not described herein are also within the scope of the following claims. For example, process 25 can be performed using evaluation rules other than those described herein. Process 25 can be performed on any type of 3D model, not just 3D landscape models. Process 25 can be performed using subdivision techniques other than the butterfly subdivision technique described above.

APPENDIX

```
set each quad tree start point = root node
while ( )
{
  for each (quad tree)
  {
    while (evaluation rule allows)
    {
      begin evaluating the quad tree in a breadth-
      first manner at the indicated start point
      at each node visited, evaluate adaptive
      subdivision parameter and perform subdivision
      computations if indicated
      evaluate evaluation rule, terminate traversal
      if indicated
    }
    set a new traversal start point:   quad tree start
    point = last node visited
  }
  render the current leaves of the quad tree
  update camera position
}
```

What is claimed is:

1. A method of subdividing a subdivision surface comprised of polygons, the method comprising:
   traversing the subdivision surface in a first frame of video to locate a target polygon on the subdivision surface;
   partially subdividing the target polygon, wherein a number of subdivisions performed during the partially subdividing varies in accordance with motion of the virtual camera relative to the target polygon;
   re-traversing the subdivision surface in a second frame of video to locate the target polygon on the subdivision surface; and
   additionally subdividing the target polygon;
   wherein additionally subdividing comprises subdividing the target polygon beginning at a point in the subdividing process where partially subdividing left off.

2. The method of claim 1, further comprising storing data indicating a point in a subdividing process where the partially subdividing left off;
   wherein additionally subdividing comprises subdividing the target polygon in accordance with the data.

3. The method of claim 2, further comprising obtaining a rule that defines a level of subdivisions associated with the subdividing process;
   wherein the additionally subdividing comprises subdividing the target polygon to, at most, the level of subdivisions associated with the subdividing process.

4. The method of claim 3, wherein the subdivision surface corresponds to a model and the rule corresponds to a feature of the model.

5. The method of claim 3, wherein the rule is designated by a user.

6. The method of claim 1, wherein:
   the target polygon is associated with a quad tree comprised of levels of sub-polygons;
   the partially subdividing comprises obtaining a first level of sub-polygons from the quad tree and replacing the target polygon with sub-polygons from the first level; and
   the additionally subdividing comprises obtaining a second level of sub-polygons from the quad tree and replacing the sub-polygons from the first level with sub-polygons from the second level.

7. The method of claim 1, wherein the subdivision surface is included in the first and second frames of video and the second frame follows the first frame in time.

8. The method of claim 7, wherein the first frame of video corresponds to a first time when a virtual camera is moving relative to the subdivision surface in the video, and the second frame of video corresponds to a second time when the virtual camera is moving relative to the subdivision surface in the video.

9. The method of claim 1, wherein partially subdividing is performed for a first time slice and additionally subdividing is performed for a second time slice.

10. The method of claim 1, wherein partially subdividing increases a granularity of a model represented by the target polygon and additionally subdividing further increases the granularity of the model represented by the target polygon.

11. An article comprising a computer-readable medium which stores computer instructions for subdividing a subdivision surface comprised of polygons, the instructions causing a computer to:
    traverse the subdivision surface in a first frame of video to locate a target polygon on the subdivision surface;
    partially subdivide the target polygon, wherein a number of subdivisions performed during the partially subdividing varies in accordance with motion of the virtual camera relative to the target polygon;
    re-traverse the subdivision surface in a second frame of video to locate the target polygon on the subdivision surface; and
    additionally subdivide the target polygon;
    wherein additionally subdividing comprises subdividing the target polygon beginning at the point in the subdividing process where partially subdividing left off.

12. The article of claim 11, further comprising instructions which cause the computer to store data indicating a point in a subdividing process where the partially subdividing left off;
    wherein additionally subdividing comprises subdividing the target polygon in accordance with the data.

13. The article of claim 12, further comprising instructions that cause the computer to obtain a rule that defines a level of subdivisions associated with the subdividing process;
    wherein additionally subdividing comprises subdividing the target polygon to, at most, the level of subdivisions associated with the subdividing process.

14. The article of claim 13, wherein the subdivision surface corresponds to a model and the rule corresponds to a feature of the model.

15. The article of claim 13, wherein the rule is designated by a user.

16. The article of claim 11, wherein:
    the target polygon is associated with a quad tree comprised of levels of sub-polygons;
    partially subdividing comprises obtaining a first level of sub-polygons from the quad tree and replacing the target polygon with sub-polygons from the first level; and
    additionally subdividing comprises obtaining a second level of sub-polygons from the quad tree and replacing the sub-polygons from the first level with sub-polygons from the second level.

17. The article of claim 11, wherein the subdivision surface is included in the first and second frames of video and the second frame follows the first frame in time.

18. The article of claim 17, wherein the first frame of video corresponds to a first time when a virtual camera is moving relative to the subdivision surface in the video, and the second frame of video corresponds to a second time when the virtual camera is moving relative to the subdivision surface in the video.

19. The article of claim 11, wherein partially subdividing is performed for a first time slice and additionally subdividing is performed for a second time slice.

20. The article of claim 11, wherein partially subdividing increases a granularity of a model represented by the target polygon and additionally subdividing further increases the granularity of the model represented by the target polygon.

21. An apparatus for subdividing a subdivision surface comprised of polygons, the apparatus comprising:
a memory which stores computer instructions; and
a processor which executes the computer instructions to:
  (i) traverse the subdivision surface in a first frame of video to locate a target polygon on the subdivision surface;
  (ii) partially subdivide the target polygon, wherein a number of subdivisions performed during the partially subdividing varies in accordance with motion of the virtual camera relative to the target polygon;
  (iii) re-traverse the subdivision surface in a second frame of video to locate the target polygon on the subdivision surface; and
  (iv) additionally subdivide the target polygon;
wherein additionally subdividing comprises subdividing the target polygon beginning at a point in the subdividing process where partially subdividing left off.

22. The apparatus of claim 21, wherein:
the processor executes instructions to store data indicating a point in a subdividing process where the partially subdividing left off; and
additionally subdividing comprises subdividing the target polygon in accordance with the data.

23. The apparatus of claim 22, wherein:
the processor executes instructions to obtain a rule that defines a level of subdivisions associated with the subdividing process; and
additionally subdividing comprises subdividing the target polygon to, at most, the level of subdivisions associated with the subdividing process.

24. The apparatus of claim 23, wherein the subdivision surface corresponds to a model and the rule corresponds to a feature of the model.

25. The apparatus of claim 23, wherein the rule is designated by a user.

26. The apparatus of claim 21, wherein:
the target polygon is associated with a quad tree comprised of levels of sub-polygons;
partially subdividing comprises obtaining a first level of sub-polygons from the quad tree and replacing the target polygon with sub-polygons from the first level; and
additionally subdividing comprises obtaining a second level of sub-polygons from the quad tree and replacing the sub-polygons from the first level with sub-polygons from the second level.

27. The apparatus of claim 21, wherein the subdivision surface is included in the first and second frames of video and the second frame follows the first frame in time.

28. The apparatus of claim 27, wherein the first frame of video corresponds to a first time when a virtual camera is moving relative to the subdivision surface in the video, and the second frame of video corresponds to a second time when the virtual camera is moving relative to the subdivision surface in the video.

29. The apparatus of claim 21, wherein partially subdividing is performed for a first time slice and additionally subdividing is performed for a second time slice.

30. The apparatus of claim 21, wherein partially subdividing increases a granularity of a model represented by the target polygon and additionally subdividing further increases the granularity of the model represented by the target polygon.

31. A method of processing frames of three-dimensional video data comprised of polygons in a subdivision surface, the method comprising:
locating polygons in a first frame of video;
subdividing located polygons in the first frame of the video data to increase a resolution of the first frame, the polygons being subdivided up to a point, wherein a number of subdivisions performed during the subdividing varies in accordance with motion of the virtual camera relative to the target polygon; and
subdividing polygons in a second frame of the video data that were generated by subdividing the first frame of video data to increase the resolution of the second frame over the resolution of the first frame, wherein subdividing the polygons in the second frame begins at the point where subdividing in the first frame left off.

32. The method of claim 31, wherein the first and second frames of video data are spatially coherent such that the polygons subdivided in the first and second frames define a same element in the first and second frames.

33. The method of claim 31, wherein:
each polygon in the first frame is associated with a quad tree comprised of levels of sub-polygons;
subdividing a polygon in the first frame comprises obtaining a first level of sub-polygons from a quad tree and replacing the polygon with sub-polygons from the first level; and
subdividing the polygon in the second frame comprises obtaining a second level of sub-polygons from the quad tree and replacing the sub-polygons from the first level with sub-polygons from the second level.

34. An article comprising a machine-readable medium that stores instructions to process frames of three-dimensional video data comprised of polygons in a subdivision surface, the instructions causing a machine to:
locate polygons in a first frame of video;
subdivide located polygons in the first frame of the video data to increase a resolution of the first frame, the polygons being subdivided up to a point, wherein a number of subdivisions performed during the subdividing varies in accordance with motion of the virtual camera relative to the target polygon; and
subdivide polygons in a second frame of the video data that were generated by subdividing the first frame of video data to increase the resolution of the second frame over the resolution of the first frame, wherein subdividing the polygons in the second frame begins at the point where subdividing in the first frame left off.

35. The article of claim 34, wherein the first and second frames of video data are spatially coherent such that the polygons subdivided in the first and second frames define a same element in the first and second frames.

36. The article of claim 34, wherein:
each polygon in the first frame is associated with a quad tree comprised of levels of sub-polygons;

subdividing a polygon in the first frame comprises obtaining a first level of sub-polygons from a quad tree and replacing the polygon with sub-polygons from the first level; and subdividing the polygon in the second frame comprises obtaining a second level of sub-polygons from the quad tree and replacing the sub-polygons from the first level with sub-polygons from the second level.

37. An apparatus for processing frames of three-dimensional video data comprised of polygons in a subdivision surface, the apparatus comprising:

a processing device that executes instructions to:

locate polygons in a first frame of video;

subdivide located polygons in the first frame of the video data to increase a resolution of the first frame, the polygons being subdivided up to a point, wherein a number of subdivisions performed during the subdividing varies in accordance with motion of the virtual camera relative to the target polygon; and subdivide polygons in a second frame of the video data that were generated by subdividing the first frame of video data to increase the resolution of the second frame over the resolution of the first frame, wherein subdividing the polygons in the second frame begins at the point where subdividing in the first frame left off.

38. The apparatus of claim 37, wherein the first and second frames of video data are spatially coherent such that the polygons subdivided in the first and second frames define a same element in the first and second frames.

39. The apparatus of claim 37, wherein:

each polygon in the first frame is associated with a quad tree comprised of levels of sub-polygons;

subdividing a polygon in the first frame comprises obtaining a first level of sub-polygons from a quad tree and replacing the polygon with sub-polygons from the first level; and subdividing the polygon in the second frame comprises obtaining a second level of sub-polygons from the quad tree and replacing the sub-polygons from the first level with sub-polygons from the second level.

* * * * *